(12) United States Patent
Mayers et al.

(10) Patent No.: US 8,412,812 B1
(45) Date of Patent: Apr. 2, 2013

(54) CLIENT-SIDE MEASUREMENT OF LOAD TIMES

(75) Inventors: Eric Mayers, Hayward, CA (US); Luke Stone, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 1185 days.

(21) Appl. No.: 11/027,922

(22) Filed: Dec. 30, 2004

(51) Int. Cl.
*G06F 15/173* (2006.01)
*G06F 15/16* (2006.01)

(52) U.S. Cl. ......... 709/224; 709/203; 709/231; 709/246

(58) Field of Classification Search .................. 709/203, 709/224, 231, 246; 370/230; 707/205, 14; 705/14, 205
See application file for complete search history.

(56) References Cited

U.S. PATENT DOCUMENTS

| | | | | |
|---|---|---|---|---|
| 6,003,030 | A * | 12/1999 | Kenner et al. .......................... 1/1 |
| 6,122,661 | A * | 9/2000 | Stedman et al. .............. 709/217 |
| 6,167,397 | A * | 12/2000 | Jacobson et al. .................. 707/5 |
| 6,438,592 | B1 * | 8/2002 | Killian .......................... 709/224 |
| 6,587,878 | B1 * | 7/2003 | Merriam ...................... 709/224 |
| 7,136,875 | B2 | 11/2006 | Anderson et al. |
| 2002/0116491 | A1 * | 8/2002 | Boyd et al. .................... 709/224 |
| 2002/0194310 | A1 * | 12/2002 | Chu et al. ..................... 709/219 |
| 2006/0031466 | A1 * | 2/2006 | Kovach .......................... 709/224 |
| 2006/0253850 | A1 * | 11/2006 | Bruno et al. ................... 717/173 |
| 2009/0138538 | A1 * | 5/2009 | Klein ............................ 709/201 |

OTHER PUBLICATIONS

"How to measure page load times," downloaded from http://groups-beta.google.com/group/netscape.public.mozilla.performance/browse_frm/thread/2214b6feb5a4ecc6?hl=en&lr=&ie=UTF-8&rnum=1&prev=/groups%3Fq%3D%2522measure%2Bpage%2Bload%2Btimes%2522%26hl%3Den%26lr%3D%26ie%3DUTF-8%26selm%3D3B854B60.5050001%2540packeteer.com%26rnum%3D1 on Dec. 30, 2004, 6 pgs.

\* cited by examiner

*Primary Examiner* — Haresh N Patel
*Assistant Examiner* — Peter Shaw
(74) *Attorney, Agent, or Firm* — Fish & Richardson P.C.

(57) ABSTRACT

Document load times may be determined by (a) accepting a first set of one or more document identifiers, (b) for each of the one or more document identifiers of the first set, requesting the document, downloading the document, and rendering the document, and (c) determining a first elapsed time from about the time of requesting a first document identified by the first set of one or more document identifiers to about the time of completion of the rendering of a last document identified by the first set of one or more document identifiers. This may be repeated for a second set of documents. For example, a first set of document(s) may be located at a first serving facility and the second set of document(s) may be located at a second serving facility.

24 Claims, 3 Drawing Sheets

CLIENT-SIDE MEASUREMENT OF LOAD TIMES

§0.1 COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

§0.2 REFERENCE TO COMPUTER PROGRAM LISTING SUBMITTED ON COMPACT DISC

A computer program listing on compact disc is filed herewith. This compact disc includes a text file, titled "computer program listing appendix", created on Dec. 29, 2004, and 12 KB in size. The material on the compact disc is incorporated herein by reference.

§1. BACKGROUND OF THE INVENTION

§1.1 Field of the Invention

The present invention concerns loading documents such as Web pages for example. In particular, the present invention concerns measuring load times (e.g., time for a client to request, download and render), which may be a function of communications network speed and rendering speed of a document rendering application, such as a browser for example, the time it takes for a server to serve the document, etc.

§1.2 Background Information

As the speed of communications networks and microprocessors has continued to increase, peoples' tolerance for delays has decreased. For example, since the advent of the World Wide Web, the demand for downloading documents with richer content has driven the development of better and faster modems.

To meet this need, modem speeds have increased dramatically, from 300 baud (bits per second), to 1200 baud, to 33.6 Kbps, to 56 Kbps. Interactive Services Digital Network (ISDN) services provide two 64 kbps channels which may be bound to provide a throughput of 128 Kbps. Digital Subscriber Line (DSL) can provide even faster speeds, subject to the gauge of phone wire used and the distance from a central switching office. Satellite and cable modems have provided even faster speeds.

As network speeds have increased, Web pages have started to include more sophisticated content, such as graphical elements, animations, audio files, video files, scripts and so on. Many people with slower Internet connections have become dissatisfied with their slower connections and have migrated toward higher speed connections such as cable modems and DLS modems for example.

To help users evaluate their present Internet connections, various bandwidth connection speed tests have become available to measure the speed of communications connections to the Internet. Unfortunately, however, such tests typically measure only the network speed in terms of the time consumed to download a file. An end user's Internet browsing experience is often a function of the delay between their selection of a document, and the complete rendering of that document. The speed of communications connections to the Internet is just one components of this overall delay. For example, the rendering of a received document may be a function of one or more of a browser (type) used, a computer used, content of the document, caching, etc.

In view of the need to satisfy users by decreasing or at least bounding delays, and in view of the limitations of present bandwidth connection speed tests, the present inventors believe that it would be useful to provide additional tests or different tests to help determine delays, particularly delays associated with Internet browsing. The present inventors also believe that it would be useful to evaluate various potential sources of delay.

§2. SUMMARY OF THE INVENTION

At least some embodiments consistent with the present invention facilitate document load timing by (a) accepting a first set of one or more document identifiers, (b) for each of the one or more document identifiers of the first set, requesting the document, downloading the document, and rendering the document, and (c) determining a first elapsed time from about the time of requesting a first document identified by the first set of one or more document identifiers to about the time of completion of the rendering of a last document identified by the first set of one or more document identifiers.

In at least some embodiments consistent with the present invention, this may be repeated for a second set of documents. For example, in such embodiments, a first set of document(s) may be located at a first serving facility and the second set of document(s) may be located at a second serving facility. As another example, in such embodiments, a first set of document(s) may include a first number of ads and the second set of document(s) may include a second number of ads, wherein the second number is greater than the first number. As still another example, the first set of document(s) may include a first type of ads and the second set of document(s) may include a second type of ads, wherein the first type is different from the second type. As yet another example, the first set of document(s) may include a first number of search results and the second set of document(s) may include a second number of search results, wherein the second number is greater than the first number.

In at least some embodiments consistent with the present invention, time for individual document loads may be tracked instead of, or in addition to, a time to load a collection of documents.

In at least some embodiments consistent with the present invention, the same collection of documents is loaded using a first combination of processor characteristics, memory characteristics, operating system characteristics, browser characteristics, client device location, request time of day, request day of week, request time of year, etc. and second combination of processor characteristics, memory characteristics, operating system characteristics, browser characteristics, client device location, request time of day, request day of week, request time of year, etc.

In at least some embodiments of the present invention, the documents may be Web pages. In at least some such embodiments, the document identifiers may be universal resource locators.

§3. BRIEF DESCRIPTION OF THE DRAWINGS

§4. DETAILED DESCRIPTION

Figure 1:
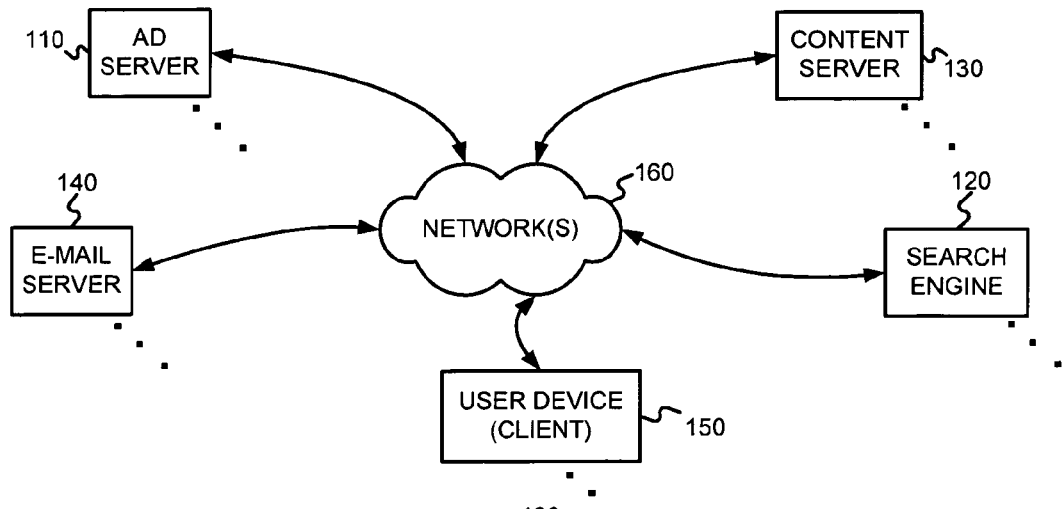
FIG. 1 is a diagram of an environment in which, or with which, embodiments consistent with the present invention may operate.

The present invention may involve novel methods, apparatus, message formats, and/or data structures for measuring delays between the time a document (or documents are) is requested and the time it is (or they are all) rendered. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, definitions of terms that may be used in this application are provided in §4.1. Then, environments in which, or with which, the present invention may operate are described in §4.2. Thereafter, exemplary embodiments of the present invention are described in §4.3. Finally, some conclusions regarding the present invention are set forth in §4.4.

§4.1 Definitions

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Abobe Acrobat pdf reader), etc.

The time to "load" a document is substantially the time it takes for a client to request, download and render the document. Stated differently, the time to "load" a document is the time from substantially when a client requests a document to substantially when the client completes its rendering of the document. The load time may also include the time it takes for a server to serve the document.

§4.2 Environments in which, or with which, the Present Invention May Operate

FIG. 1 illustrates an environment 100 in which the present invention may be used. A user device (also referred to as a "client" or "client device") 150 may include a browser facility (such as the Explorer browser from Microsoft, the Opera Web Browser from Opera Software of Norway, the Navigator browser from AOL/Time Warner, the Firefox browser from Mozilla, etc.), some other content rendering facility, etc. A search engine 120 may permit user devices 150 to search collections of documents (e.g., Web pages). A content server 110 may permit user devices 150 to access documents. Web-based email servers (or interfaces to email) (such as Gmail from Google, Hotmail from Microsoft Network, Yahoo Mail, etc.) 140 may be used to provide e-mail functionality to user devices 150. An ad server 110 may be used to serve ads to user devices 150. For example, the ads may be served in association with search results provided by the search engine 120. The AdWords service presently provided by Google is an example of keyword-targeted ads served with search results. Alternatively, or in addition, content-relevant ads may be served in association with content provided by the content server 130, and/or e-mail supported by the e-mail server 140 and/or user device e-mail facilities. The AdSense service presently provided by Google is an example of content-targeted ads served with content. U.S. patent application Ser. No. 10/375,900, entitled "SERVING ADVERTISEMENTS BASED ON CONTENT", filed on Feb. 26, 2003, and listing Darrell Anderson, Paul Bucheit, Alexander Paul Carobus, Yingwei Cui, Jeffrey A. Dean, Georges R. Harik, Deepak Jindal and Narayanan Shivakumar as inventors (referred to as the '900 application and incorporated herein by reference) describes exemplary embodiments for serving content-relevant ads with documents.

§4.3 Exemplary Embodiments

Figure 2:
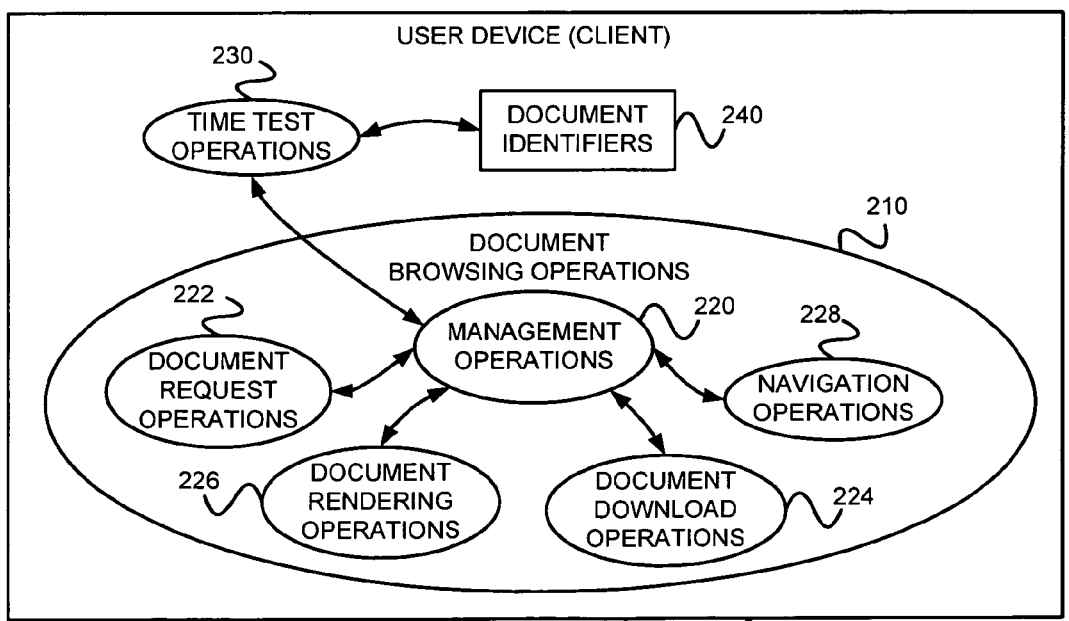
FIG. 2 is a bubble diagram of exemplary operations which may be performed in a manner consistent with the present invention, as well as information that may be used and/or generated by such operations.

FIG. 2 is a bubble diagram of operations that may be performed, as well as information that may be used and/or generated by such operations, in embodiments consistent with the present invention. Client device 200 may include document browser operations 210, time test operations 230 and document identifiers 240. The document browser operations 210 may be used to request, receive and render documents. The time test operations 230 may be used to determine the time it takes for the client device 200 (e.g., using the document browsing operations 210 for example) to load one or more requested documents. Identifiers of such documents may be stored as document identifiers 240.

In at least some embodiments consistent with the present invention, the document browser operations 210 include management operations 220 managing one or more operations including, for example, document request operations 222, document download operations 224, document rendering operations 226 and navigation operations 228. In at least some embodiments consistent with the present invention, the document browser operations 210 may be a browser (such as Explorer, Navigator, Opera and Firefox from Mozilla, for example) for browsing documents (e.g., Web pages) available from the World Wide Web or documents available from one or more networks such as the Internet or an Intranet for example. In such embodiments, the document identifiers may be universal resource locators (URLs) or path names for example.

§4.3.1 Exemplary Methods

Figure 3:
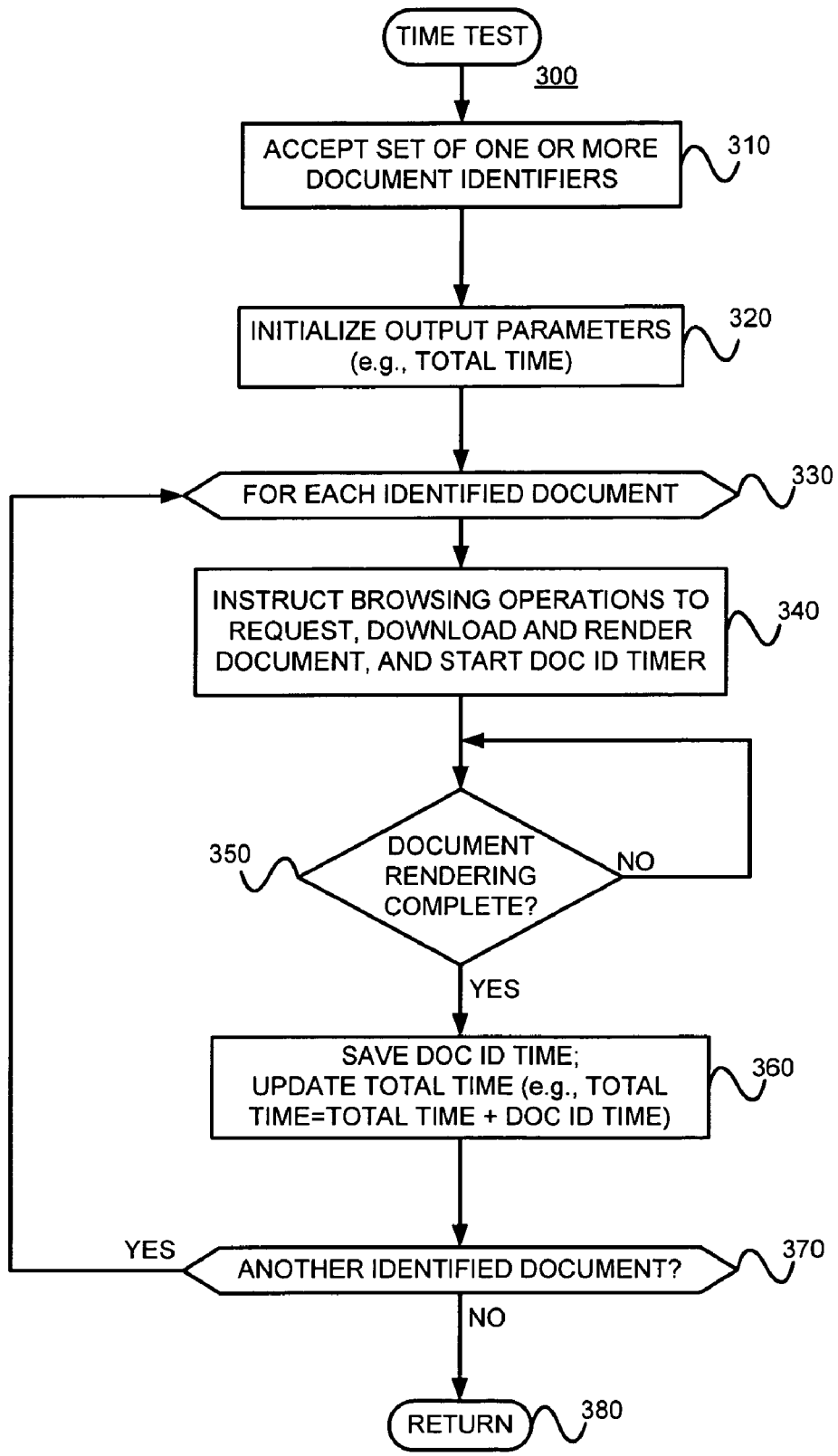
FIG. 3 is a flow diagram of an exemplary method that may be used to test timing in a manner consistent with the present invention.

FIG. 3 is a flow diagram of an exemplary method 300 that may be used to perform the time test operations 230 in a manner consistent with the present invention. A set of one or more document identifiers is accepted (Block 310) and output parameters (e.g., a total time) may be initialized (Block 320). As indicated by loop 330-370, a number of acts may be performed for each of one or more documents identified by the one or more document identifiers. More specifically, browsing operations (e.g., an Internet browser on a personal computer) may be instructed to request, download and render the document, and a timer (e.g., a document specific timer) may be started. (Block 340) Once the browsing operations have completed the rendering of the document, the (e.g., document specific) timer may be stopped, the value of the document specific timer may be saved, a total time may be updated (e.g., Total Time$_{new}$=Total Time$_{old}$+document specific timer value), and a new total time may be saved. The loop 330-370 may be repeated until there are no more identified documents, at which point, the method 300 may be left (Node 380).

Referring back to block 340, the (e.g., document specific) timer may be started (e.g., just) before the document is requested, substantially concurrent with the document request, or (e.g., just) after the document has been requested.

Although document specific timers may be used to track the time needed to render each requested document, at least some embodiments consistent with the present invention might simply track a total or cumulative time needed to render all of the requested documents. In such embodiments, the total time may simply be started (e.g., (just) before, concurrently with, or (just) after) with the first document request and stopped and saved after all documents have been rendered. Similarly, although a total time was described as being tracked, this is not necessary. Load times for one or more documents may be tracked on a per document basis.

Although the time test techniques described above are useful with individual documents, defining the set to include more documents may provide better results, and certain anomalies may average out or become less significant. The method 300 of FIG. 3 indicates a "total time" as being the sum of all the document load times. In at least some alternative embodiments consistent with the present invention, single document load times are calculated (by subtracting a start time from an end time) and reported individually as they are determined.

Although not shown, in some embodiments consistent with the present invention, the entire set of documents may be loaded a number of times to determine more datapoints overall. Data may be aggregated before, during, or after the reporting of per-document load times. Some embodiments consistent with the present invention, some load times might not be aggregated at all. Thus, in at least some embodiments, the times are not accumulated before reporting. Pseudo-code for such an embodiment is:

Time test
For the number of iterations specified (e.g. 3):
   For each document in the set:
      Initialize parameters
      Start timer
      Instruct browsing operations to request, download and render document
      [Wait for browser to report that the above operation is complete]
      Stop timer
      Report elapsed (stop-start) time along with document identifier and the iteration.
   Iteration is complete
Test is complete If the time to render a document is significant (as may be the case with audio documents of songs, video documents of movies, etc.), such documents (referred to as "rich media files") may be avoided in at least some embodiments of the present invention. This may be advisable since different browsers may handle these rich media files differently. For example, one browser may start the Quicktime™ media player (from Apple of Cupertino, Calif.) to handle a movie file, while another browser might start a media player. These components and the browsers calling them may use different mechanisms to report when the documents are complete. For example, one might report completion as soon as it can begin showing the movie (but it may not be completed). Another might report completion when the file download is finished. Another may report completion when the handling component (e.g. Quicktime™) has loaded regardless of the state of the media file.

§4.3.2 Exemplary Apparatus

Figure 4:
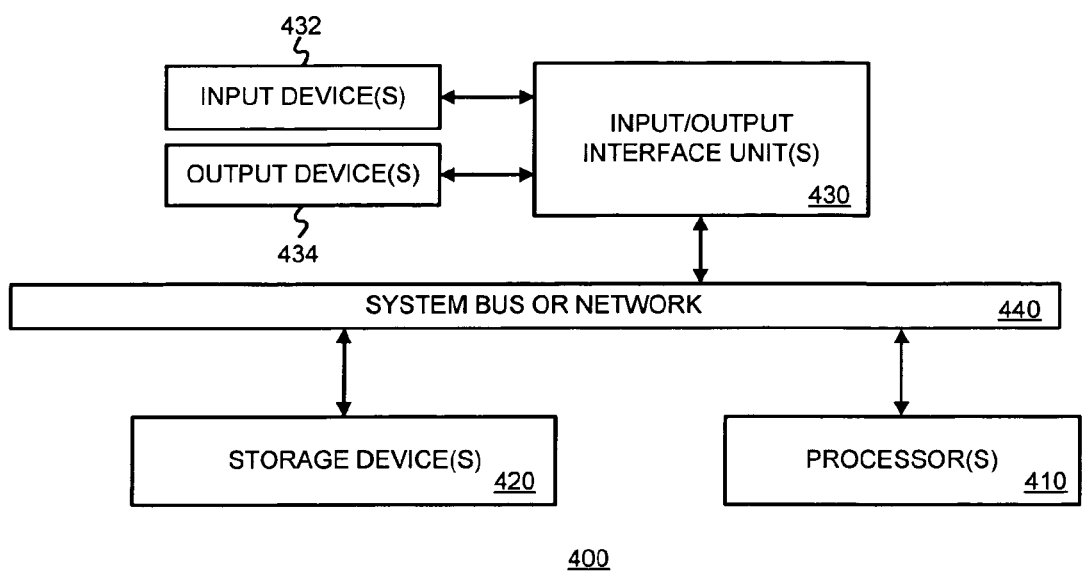
FIG. 4 is a block diagram of exemplary apparatus that may be used to perform at least some operations and store at least some information in a manner consistent with the present invention.

FIG. 4 is block diagram of a machine 400 that may perform one or more of the operations discussed above. The machine 400 basically includes one or more processors 410, one or more input/output interface units 430, one or more storage devices 420, and one or more system buses and/or networks 440 for facilitating the communication of information among the coupled elements. One or more input devices 432 and one or more output devices 434 may be coupled with the one or more input/output interfaces 430.

The one or more processors 410 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C., Java from Sun Microsystems of Santa Clara, Calif., etc.) to effect one or more aspects of the present invention. At least a portion of the machine executable instructions may be stored (temporarily or more permanently) on the one or more storage devices 420 and/or may be received from an external source via one or more input interface units 430. The Appendix includes code which, when executed, performs a method consistent with the present invention. The contents of the Appendix are incorporated herein by reference. The present invention is not limited by the specific code provided in the Appendix.

In one embodiment, the machine 400 may be one or more conventional personal computers. In this case, the processing units 410 may be one or more microprocessors. The bus 440 may include a system bus. The storage devices 420 may include system memory, such as read only memory (ROM)

and/or random access memory (RAM). The storage devices 420 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 432, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 410 through an appropriate interface 430 coupled to the system bus 440. The output devices 434 may include a monitor or other type of display device, which may also be connected to the system bus 440 via an appropriate interface. In addition to (or instead of) the monitor, the personal computer may include other (peripheral) output devices (not shown), such as speakers and printers for example.

The various operations described above may be performed by one or more machines 400, and the various information described above may be stored on one or more machines 400. The ad server 110, search engine 120, content server 130, e-mail server 140, and/or user device 150 may include one or more machines 400.

§4.3.3 Alternatives and Extensions

The present invention is not limited to the particular embodiments described above. For instance, embodiments consistent with the present invention could measure the load times of currently unknown files types, record component (request to response, download, render, etc) times, report measured times to multiple locations, and/or in multiple formats, report times in an encrypted fashion, record individual load times for documents loading simultaneously, etc.

Further, timing test result-dependent actions (such as fetching future documents from a faster datacenter) can be specified, and such actions may be taken (or considered) automatically upon (or after) the completion of a timing test (such as those described above). In such embodiments, perform this timing and assessment on the client device may be advantageous since doing so may allow each individual client device to have an optimized experience. This is different from some existing methods of load balancing (e.g. Akamai) where entire networks are assessed centrally and pointed to a specific datacenter.

In some cases, the time taken to lookup the Internet protocol (IP) address from a hostname indicated in a URL (domain name resolution) may or may not be encapsulated in the elapsed time depending on the nature of the platform on which the system is running. That is, some operating systems may cache the IP address of domain names that were already looked up and not need to look up the address again. Others might be looking up the address for the first time, or might not have a caching mechanism, and therefore would include this time in the elapsed time reported. (In any case the time elapsed is still the actual time that the user had to wait for the page to load). In at least some embodiments consistent with the present invention, it may be desired to remove the influence of systems which cache previously resolved domain names (and/or previously loaded components). Such embodiments may do this by appending a randomized parameter to the request URL.

§4.3.4 Exemplary Applications

Exemplary embodiments of the time test techniques described above may be used in various applications. Often, the application will be defined by the set of one or more documents. For example, the documents may be documents with identical content but stored at different facilities (e.g., data centers). The timing test techniques could be used to compare, for a particular client or group of clients, a time to request and render the set of identical documents.

In another example, a first set of documents may have a first number (which may be zero) of (e.g., inserted) ads, while a second set of the same documents are served with a second number of (e.g., inserted) ads. A comparison between the times corresponding to the two sets of documents can provide information about the extent to which providing ads (or more ads) degrades the experience of requesting and rendering the documents.

In yet another example, a first set of documents may have a first type of ads (e.g., text-only ads), while a second set of the same documents may be served with different types of ads (e.g., ads with graphical elements, audio, animation, video, etc.) A comparison between the times corresponding to the two sets of documents can provide information about the extent to which providing different types of ads degrades or enhances the experience of requesting and rendering the documents. Naturally, the first set of documents may have a first number of a first type of ads, while the second set of documents may have a second number of a second type of ads.

In still another example, a first set of search result page documents may have a first number (and/or search results using a first formatting scheme) of search results, while a second set search results pages, which are generated in response to the same search query or queries, are served with a second number of search results (and/or search results using a second formatting scheme). A comparison between the times corresponding to the two sets of documents can provide information about the extent to which providing more search results (and/or search results with different formatting schemes) degrades or enhances the experience of requesting and rendering the documents.

In yet another example, embodiments consistent with the present invention may be used to measure the impact of web acceleration technologies, such as caches, proxy systems, etc. This may be accomplished by (i) running a test (or a series of tests) with the web acceleration technology turned off, (ii) running the same test (or series of tests) with the web acceleration technology (or technologies) turned on and (iii) comparing the two results to judge the effectiveness of the web acceleration technology or technologies.

As can be appreciated from just the few examples provided above, by appropriately defining the sets of documents to be processed, potentially important information comparing the performance of different servers, different document formats, different document inserts (e.g., ads), different browsers, different computer platforms, different caching techniques, etc. can be gathered. Moreover, observing the total time may be useful when judging whether or not using a particular document, document format, document insert, document serving facility, etc. will be acceptable to end users. In yet another exemplary application, load times for a set of documents (e.g., from a given server) may be compared for different client device locations (geographically and/or in terms of the network). In still another example, load times for a set of documents (e.g., from a given server) may be compared for different request times (e.g., time of day, day of week, time of year, etc.).

As can be appreciated from the foregoing examples, a test result might indicated that a new ad display scheme works well during certain time periods during the day (e.g., low load periods after midnight), but only for users in certain locations (e.g., China), or only for users using a particular browser version.

§4.4 Conclusions

As can be appreciated from the foregoing, embodiments consistent with the present invention can be used to help determine delays (and perhaps their sources) associated with Internet browsing.

What is claimed is:

1. A computer-implemented method comprising:
   accepting a set of one or more document identifiers;
   for each of the one or more document identifiers of the set, and using a client device characterized by a first combination of processor characteristics, memory characteristics, operating system characteristics, browser characteristics, client device location, request time of day, request day of week, and request time of year:
      appending a randomized parameter to a request for a document identified by the document identifier;
      requesting the document from a first serving facility using the request with the appended randomized parameter,
      receiving the document from the first serving facility in response to the requesting, and
      rendering the received document, the document including a first type of ad;
   determining a first elapsed time from an earliest time of requesting, using the client device characterized by the first combination, a first document identified by the set of one or more document identifiers to a latest time of completion of the rendering, using the client device characterized by the first combination, of a last document identified by the set of one or more document identifiers;
   for each of the one or more document identifiers of the set, and using a client device characterized by a second combination of processor characteristics, memory characteristics, operating system characteristics, browser characteristics, client device location, request time of day, request day of week, and request time of year:
      appending a randomized parameter to a request for a document identified by the document identifier;
      requesting the document from the first serving facility using the request with the appended randomized parameter,
      receiving the document from the first serving facility in response to the requesting, and
      rendering the received document, the document including the first type of ad;
      determining a second elapsed time from an earliest time of requesting, using the client device characterized by the second combination, the first document identified by the set of one or more document identifiers to a latest time of completion of the rendering, using the client device characterized by the second combination, of the last document identified by the set of one or more document identifiers; and
   determining whether to send subsequent requests for documents having the same content as the document identified by the document identifier and including a different, second type of ad to a different, second serving facility based at least in part on a comparison of the first elapsed time to the second elapsed time and the first and second types of ads;
   wherein the determining is performed using one or more processors.

2. The computer-implemented method of claim 1, wherein the document is a web page.

3. The computer-implemented method of claim 1, wherein the document identifier is a universal resource locator.

4. The computer-implemented method of claim 1, wherein determining whether to send subsequent requests for documents to a different, second serving facility comprises:
   selecting a different, second serving facility based on the first elapsed time; and
   sending subsequent requests for documents to the different, second serving facility.

5. The computer-implemented method of claim 1, wherein the document includes an audio file or a video file, and the time of completion of the rendering of the document is defined as the time when a handling component of the audio file or the video file loads, the handling component being a software program that plays the audio file or the video file.

6. The computer-implemented method of claim 1, wherein the document includes an audio file or a video file, and the time of completion of the rendering of the document is defined as the time when the audio file or the video file begins playing.

7. The computer-implemented method of claim 1, wherein the document identified by the document identifier includes a first number of ads and the subsequently requested document having the same content includes a different, second number of ads, wherein the second number is greater than the first number.

8. The computer-implemented method of claim 1, wherein the document identified by the document identifier includes a first number of search results and one of the subsequently requested documents includes a different, second number of search results, wherein the second number is greater than the first number.

9. The computer-implemented method of claim 8, wherein the document identified by the document identifier and the subsequently requested document having the same content are search result pages responsive to the same query.

10. The computer-implemented method of claim 1, wherein determining whether to send subsequent requests for documents to a different, second serving facility is further based on a time of day or a geographical location.

11. The computer-implemented method of claim 1, wherein the time of completion of the rendering of the document is different from a time of completion of the receiving of the document.

12. The computer-implemented method of claim 1, wherein the first type of ad is a text-only ad and the second type of ad is an ad with graphical or audio elements.

13. A computer-implemented method comprising:
    accepting a set of one or more document identifiers;
    for each of the one or more document identifiers of the set, and using a client device characterized by a first combination of processor characteristics, memory characteristics, operating system characteristics, browser characteristics, client device location, request time of day, request day of week, request time of year:
       appending a randomized parameter to a request for a document identified by the document identifier,
       requesting the document from a first serving facility using the request with the appended randomized parameter,
       receiving the document from the first serving facility in response to the requesting,
       rendering the received document, the document including a first type of ad, and further determining for each document requested using the client device characterized by the first combination an elapsed time from the time of requesting the document to the time of completion of the rendering of the document;

for each of the one or more document identifiers of the set, and using a client device characterized by a second combination of processor characteristics, memory characteristics, operating system characteristics, browser characteristics, client device location, request time of day, request day of week, request time of year:
appending a randomized parameter to a request for a document identified by the document identifier,
requesting the document from a first serving facility using the request with the appended randomized parameter,
receiving the document from the first serving facility in response to the requesting,
rendering the received document, the document including the first type of ad, and
determining for each document requested using the client device characterized by the second combination an elapsed time from the time of requesting the document to the time of completion of the rendering the document; and determining whether to send subsequent requests for documents having the same content as the document identified by the document identifier and including a different, second type of ad to a second, different serving facility based on the elapsed times and the first and second types of ads;

wherein the determining is performed using one or more processors.

14. The computer-implemented method of claim 13, wherein the document is a web page.

15. The computer-implemented method of claim 13, wherein the document identifier is a universal resource locator.

16. The computer-implemented method of claim 13, wherein determining whether to send subsequent requests for documents to a different, second serving facility comprises:
selecting a different, second serving facility based on the first elapsed time; and
sending subsequent requests for documents to the different, second serving facility.

17. The computer-implemented method of claim 13, wherein the document includes an audio file or a video file, and the time of completion of the rendering of the document is defined as the time when a handling component of the audio file or the video file loads, the handling component being a software program that plays the audio file or the video file.

18. The computer-implemented method of claim 13, wherein the document includes an audio file or a video file, and the time of completion of the rendering of the document is defined as the time when the audio file or the video file begins playing.

19. The computer-implemented method of claim 13, wherein the document identified by the document identifier includes a first number of ads and the subsequently requested document having the same content includes a different, second number of ads, wherein the second number is greater than the first number.

20. The computer-implemented method of claim 13, wherein the document identified by the document identifier includes a first number of search results and one of the subsequently requested documents includes a different, second number of search results, wherein the second number is greater than the first number.

21. The computer-implemented method of claim 20, wherein the document identified by the document identifier and the subsequently requested document having the same content are search result pages responsive to the same query.

22. The computer-implemented method of claim 13, wherein determining whether to send subsequent requests for documents to a different, second serving facility is further based on a time of day or a geographical location.

23. The computer-implemented method of claim 13, wherein the time of completion of the rendering of the document is different from a time of completion of the receiving of the document.

24. The computer-implemented method of claim 13, wherein the first type of ad is a text-only ad and the second type of ad is an ad with graphical or audio elements.

* * * * *